United States Patent
Koelzer

(10) Patent No.: US 7,048,000 B2
(45) Date of Patent: May 23, 2006

(54) PRESSURE REDUCING VALVE

(75) Inventor: Robert L. Koelzer, Kearney, MO (US)

(73) Assignee: Haldex Brake Corporation, Kansas City, MO (US)

(*) Notice: Subject to any disclaimer, the term of this patent is extended or adjusted under 35 U.S.C. 154(b) by 259 days.

(21) Appl. No.: 10/792,213

(22) Filed: Mar. 3, 2004

(65) Prior Publication Data

US 2005/0194046 A1 Sep. 8, 2005

(51) Int. Cl.
*G05D 16/10* (2006.01)

(52) U.S. Cl. .................. 137/505.25; 417/253; 417/295

(58) Field of Classification Search ........... 137/505.25, 137/505.28; 417/295, 253
See application file for complete search history.

(56) References Cited

U.S. PATENT DOCUMENTS

| | | | |
|---|---|---|---|
| 3,188,916 A | | 6/1965 | Beatty |
| 3,435,843 A | * | 4/1969 | Spencer ................. 137/505.25 |
| 3,437,109 A | * | 4/1969 | Egerer et al. .......... 137/505.25 |
| 3,545,485 A | * | 12/1970 | Clark .......................... 137/508 |
| 3,623,776 A | * | 11/1971 | Wellman .................... 303/9.73 |
| 3,982,795 A | | 9/1976 | Gruner ......................... 303/52 |
| 4,438,980 A | | 3/1984 | Lippiatt ...................... 303/6 C |
| 4,459,085 A | | 7/1984 | Tonegawa ................... 417/282 |
| 4,470,427 A | * | 9/1984 | Maillochaud ................ 137/112 |
| 4,498,848 A | * | 2/1985 | Petrovsky et al. .......... 417/253 |
| 4,553,907 A | | 11/1985 | Heger et al. ................ 417/297 |
| 4,563,134 A | * | 1/1986 | Hitzelberger ............... 417/295 |
| 4,922,955 A | * | 5/1990 | Uri ............................. 137/496 |
| 5,393,130 A | | 2/1995 | Graham ....................... 303/57 |
| 5,425,572 A | | 6/1995 | Koelzer et al. ............... 303/69 |
| 6,267,455 B1 | | 7/2001 | Graham ....................... 303/85 |
| 6,629,709 B1 | | 10/2003 | Tunley et al. .................. 291/2 |

* cited by examiner

*Primary Examiner*—Stephen M. Hepperle
(74) *Attorney, Agent, or Firm*—St. Onge Steward Johnston & Reens LLC

(57) ABSTRACT

A pressure reducing valve includes a housing having a passage therein, a valve body disposed within the passage, and a piston slideably disposed within the passage. The valve body includes a wall arranged transverse to the passage and dividing the passage into an input side and an output side, the wall having a plurality of openings passing therethrough, a portion of the wall between the openings and facing the output side defining a sealing surface. The piston includes a channel passing longitudinally therethrough with a sealing ledge surrounding the channel on a first end, a flange surrounding the channel on a second end, and an annular shoulder surrounding the sealing ledge. Fluid pressure at the input side acts on the shoulder and biases the piston toward the output side and fluid pressure at the output side acts on the flange and biases the piston toward the input side.

19 Claims, 4 Drawing Sheets

PRESSURE REDUCING VALVE

FIELD OF THE INVENTION

The present invention relates to a pressure reducing valve (also known as a pressure proportioning valve), of the type which can be used in conjunction with an air compressor to prevent high pressures (such as those created in a turbo charging device) from effecting the performance and reliability of the compressor components.

BACKGROUND OF THE INVENTION

As is well known, many vehicles, particularly heavy trucks and trailers, utilize compressed air to operate various vehicle systems, such as braking systems, ride control systems, trailer leveling and height control systems, etc. Generally, the compressed air required for the operation of such vehicle systems is created by an air compressor carried on the vehicle. Currently, in the case of air compressors installed on North American heavy duty trucks, the inlet air for the compressor is provided by the air system from the truck engine, which inlet air typically is under turbo charged pressure. It is not uncommon for the air pressure in the intake manifolds of such trucks to be 75 p.s.i. to meet emissions requirements as established by federal regulations, and with the advent of ever higher emissions controls on diesel engines, some engine manufacturers are increasing or are expected to increase the air intake manifold pressures even higher through improvements in the turbo charger. These higher pressures have a negative impact on the performance and durability of the air compressor, which provides air to the air brake systems and other vehicle systems which utilize compressed air. A means of reducing the pressure of this inlet air is needed in order to improve compressor performance and durability.

Pressure reducing valves, which are sometimes referred to as pressure proportioning valves, are known. U.S. Pat. No. 4,438,980 to Lippiatt ("the Lippiatt patent") discloses two designs for such valves. The first design, shown in FIG. 1 of the Lippiatt patent includes a main housing 1, having an input port 2 a pair of delivery ports 3, an exhaust port 4 and an additional vent port 5. Sealingly moveable within the housing there is provided a stepped double piston 6 having on the underside thereof an area 7 which communicates with the delivery ports 3 and which is larger than the effective area 8 on the other side of the piston which communicates with the input port 2. The two portions of the piston are provided with separate seals 9 and 10, the region between the seals 9 and 10 being vented via additional vent port 5. The piston carries a self-lapping double ended valve arrangement with respective ends 11 and 12, the end 12 being urged into engagement with a valve seat 13 by a spring 14 retained between the piston and the retaining cup 15. On downward movement of the piston the lower end of the valve member is engageable with an exhaust valve seat 16 to close off the connection between the delivery ports and the exhaust port. Further downward movement after the stabilizing effect of spring 14 is then effective to unseat the end 12 from the seat 13 thereby providing communication between the inlet port and the delivery port.

In operation of the arrangement of FIG. 1, with all ports vented, the rest position is as shown. When fluid pressure is applied to the inlet port 2, the double piston 7 moves downward to carry the double valve member toward the exhaust valve seat 16 to then close the exhaust passage and thereafter unseat valve end 12 from seat 13 to thereby provide communication from the inlet port to the delivery ports. The delivery port pressure thus increases and, upon attainment of a fluid pressure at the delivery ports which is in a reduced proportion to the inlet port pressure predetermined in accordance with the approximate ratio of the areas 8 and 7, the piston 7 returns upward to a position where the double valve laps with seats 13 and 16 closed. If the pressure at the delivery ports increases beyond the predetermined proportion sufficiently to overcome the lap stability provided mainly by spring 14 the valve end 11 unseats from the seat 16 and venting of the delivery port pressure occurs until stable equilibrium is regained. By providing the additional vent at 5, any leakage which occurs across the seal 10 or the seal 9 is vented to atmosphere.

Referring to FIG. 2, the second design again has a main housing 21, an inlet port 22, a pair of delivery ports 23 and an exhaust port 24. A piston 26 has an area 27 (generated by dimension B) subject to the pressure at the delivery ports and an annular area 28 (generated by dimension A) subject to pressure at the inlet port. The area 28 is of appreciably less area than the area 27, the ratio being such as to determine the approximate proportioning ratio of the valve. The larger diameter portion of the piston has a seal 29 and a smaller diameter portion of the piston has a seal 30 separating a region 31 which is at input port pressure from a region 32 which is always at exhaust port pressure. Carried within the piston 26 there is a sealingly slideable tubular valve member 33 with a closure surface 34 which is engageable with either or both of seat 35 formed in the piston and seat 36 formed on a tubular upstand 37 communicating with the exhaust port 24. The upstand 37 is so engageable by extending upwardly through a central aperture 38 in the piston and the valve member 33 is urged against the seat 35 by a housed spring 39. A passage in the wall of piston 26 provides a path to the valve from region 31.

In operation of the arrangement shown in FIG. 2, fluid pressure applied at the inlet port 22 is effective on the smaller area 28 of the piston 26 to tend to move the piston downward to cause the closure surface 34 to engage with seat 36 to close off the exhaust port, and further downward movement causes the member 33 to be sealingly moved in the piston to unseat the surface 34 from the seat 35 thereby providing a communication between the inlet port 22 via region 31 and the passage to delivery ports 23. Upon attainment of the predetermined proportion between the pressures at the inlet port 22 and the delivery ports 23, the valve arrangement comprising closure surface 34 and seats 36 and 35 are lapped together thereby closing off the delivery port both from the exhaust port and the inlet port. Any tendency for the delivered pressure to increase beyond the predetermined proportion of the pressure of the inlet port, to an extent to overcome the stability afforded by spring 39, causes a piston assembly to move upwards thereby briefly opening the delivery port to the exhaust port to permit partial venting to re-establish equilibrium.

While the above-described pressure reducing valves, as well as those others currently known in the art, provide the desired pressure reducing/proportioning, they sufferer from a number of disadvantages. One such disadvantage is that known valve designs are relatively complex (e.g., requiring at least two moveable parts, one or more springs, parts having complex shape, numerous seals, etc.). As such, these designs tend to be expensive to produce, complicated to assemble and prone to failure. A further disadvantage of known pressure reducing valves is that due to their complex configuration, they are not readily capable of being easily integrated into the head of the air compressor itself. Rather, they are all formed as separate units and piped in line with the air compressor, not integrally formed therewith.

What is desired, therefore, is a pressure reducing valve which reduces the air pressure of inlet air which reaches working components of a compressor, which is relatively simple in design (e.g., requiring few moveable parts, no springs, parts having simple shapes, few seals, etc.), which is inexpensive to produce, easy to assemble and not prone to failure, and which is readily capable of being easily integrated into the head of an air compressor itself.

SUMMARY OF THE INVENTION

Accordingly, it is an object of the present invention to provide a pressure reducing valve which reduces the air pressure of inlet air which reaches working components of a compressor.

Another object of the present invention is to provide a pressure reducing valve having the above characteristics and which is relatively simple in design (e.g., requiring few moveable parts, no springs, parts having simple shapes, few seals, etc).

A further object of the present invention is to provide a pressure reducing valve having the above characteristics and which is inexpensive to produce, easy to assemble and not prone to failure.

Still another object of the present invention is to provide a pressure reducing valve having the above characteristics and which is readily capable of being easily integrated into the head of an air compressor itself.

These and other objects of the present invention are achieved in one embodiment by provision of a pressure reducing valve including a housing having a passage therein, a valve body disposed within the passage in the housing, and a piston slideably disposed within the passage in the housing. The valve body includes a wall arranged transverse to the passage and dividing the passage into an input side and an output side, the wall having a plurality of openings passing therethrough from the input side to the output side, a portion of the wall between the openings and facing the output side defining a sealing surface. The piston includes a channel passing longitudinally therethrough with a sealing ledge surrounding the channel on a first end thereof, a flange surrounding the channel on a second end thereof, and an annular shoulder surrounding the sealing ledge. Fluid pressure at the input side acts on the shoulder and biases the piston toward the output side and fluid pressure at the output side acts on the flange and biases the piston toward the input side. When a ratio of pressure at the input side as compared to pressure at the output side is below a threshold value, the piston is biased by pressure at the output side so as to cause the sealing ledge of the piston to seal against the sealing surface of the wall of the valve body such that the input side is isolated from the output side. When a ratio of pressure at the input side as compared to pressure at the output side is above the threshold value, the piston is biased by pressure at the input side so as to cause the sealing ledge of the piston to unseal from the sealing surface of the wall of the valve body such that the input side is in communication with the output side and fluid flows from the input side through the openings in the wall of the valve body and through the longitudinal channel in the piston to the output side.

In some embodiments, an effective surface area of the flange is larger than an effective surface area of the shoulder. In some embodiments, the threshold value is a function of an effective surface area of the flange and an effective surface area of the shoulder. In some embodiments, the threshold value is variable by varying at least one of an effective surface area of the flange and an effective surface area of the shoulder. In some embodiments, the plurality of openings passing through the wall of the valve body comprise at least three openings arranged in an annular fashion around a longitudinal axis of the passage.

In some embodiments, the valve further includes a first annular seal disposed between the valve body and a wall of the passage in the housing and a second annular seal disposed between the piston and the wall of the passage in the housing. In certain of these embodiments, a vent is formed in the wall of the passage in the housing, the vent allowing air to flow therethrough as the piston moves relative to the valve body. In some embodiments, the valve body includes a longitudinal channel therein and the piston is slideably disposed within the channel in the valve body. In some embodiments, the valve further includes an annular seal disposed between the piston and the valve body. In some embodiments, the housing is integrally formed as part of a housing of an air compressor.

In accordance with another embodiment of the present invention, an air compressor includes a compressor housing having an inlet passage therein adapted to receive pressurized air and a pressure reducing valve disposed within the inlet passage in the compressor housing. The pressure reducing valve includes a valve body statically mounted within the inlet passage in the compressor housing and a piston slideably disposed within the inlet passage in the compressor housing, the pressure reducing valve dividing the inlet passage in the compressor housing into an input side and an output side. Fluid pressure at the input side acts on the piston and biases the piston toward the output side and fluid pressure at the output side acts on the piston and biases the piston toward the input side. When a ratio of pressure at the input side as compared to pressure at the output side is below a threshold value, the piston is biased by pressure at the output side so as to cause the piston to seal against the valve body such that the input side is isolated from the output side. When a ratio of pressure at the input side as compared to pressure at the output side is above the threshold value, the piston is biased by pressure at the input side so as to cause the piston to unseal from the valve body such that the input side is in communication with the output side and fluid flows from the input side through the pressure reducing valve to the output side.

In some embodiments, an effective surface area of a side of the piston facing the output side is larger than an effective surface area of a side of the piston facing the input side. In some embodiments, the threshold value is a function of an effective surface area of a side of the piston facing the output side and an effective surface area of a side of the piston facing the input side. In some embodiments, the threshold value is variable by varying at least one of an effective surface area of a side of the piston facing the output side and an effective surface area of a side of the piston facing the input side.

In some embodiments, the valve body includes a wall arranged transverse to the inlet passage in the compressor housing, the wall having a plurality of openings passing therethrough from the input side to the output side, a portion of the wall between the openings and facing the output side defining a sealing surface, and the piston has a channel passing longitudinally therethrough with a sealing ledge surrounding the channel on a first end thereof, a flange surrounding the channel on a second end thereof, and an annular shoulder surrounding the sealing ledge. In certain of these embodiments, the plurality of openings passing through the wall of the valve body comprise at least three openings arranged in an annular fashion around a longitudinal axis of the inlet passage in the compressor housing. In certain embodiments, the valve body includes a longitudinal channel therein and the piston is slideably disposed within the channel in the valve body. In certain of these embodiments, the compressor further includes an annular seal disposed between the piston and the valve body.

In some embodiments, the compressor further includes a first annular seal disposed between the valve body and a wall of the inlet passage in the compressor housing and a second annular seal disposed between the piston and the wall of the inlet passage in the compressor housing. In certain of these embodiments, the compressor further includes a vent formed in the wall of the inlet passage in the compressor housing, the vent allowing air to flow therethrough as the piston moves relative to the valve body.

In accordance with another embodiment of the present invention, an air compressor includes a compressor housing having an inlet passage therein adapted to receive pressurized air and a pressure reducing valve disposed within the inlet passage in the compressor housing. The pressure reducing valve includes a valve body disposed within the inlet passage in the compressor housing, the valve body having a wall arranged transverse to the inlet passage and dividing the inlet passage into an input side and an output side, the wall having a plurality of openings passing therethrough from the input side to the output side, a portion of the wall between the openings and facing the output side defining a sealing surface. The pressure reducing valve also includes a piston slideably disposed within the inlet passage in the compressor housing, the piston having a channel passing longitudinally therethrough with a sealing ledge surrounding the channel on a first end thereof, a flange surrounding the channel on a second end thereof, and an annular shoulder surrounding the sealing ledge. Fluid pressure at the input side acts on the shoulder and biases the piston toward the output side and fluid pressure at the output side acts on the flange and biases the piston toward the input side. When a ratio of pressure at the input side as compared to pressure at the output side is below a threshold value, the piston is biased by pressure at the output side so as to cause the sealing ledge of the piston to seal against the sealing surface of the wall of the valve body such that the input side is isolated from the output side. When a ratio of pressure at the input side as compared to pressure at the output side is above the threshold value, the piston is biased by pressure at the input side so as to cause the sealing ledge of the piston to unseal from the sealing surface of the wall of the valve body such that the input side is in communication with the output side and fluid flows from the input side through the openings in the wall of the valve body and through the longitudinal channel in the piston to the output side.

In some embodiments, an effective surface area of the flange is larger than an effective surface area of the shoulder. In some embodiments, the threshold value is a function of an effective surface area of the flange and an effective surface area of the shoulder. In some embodiments, the threshold value is variable by varying at least one of an effective surface area of the flange and an effective surface area of the shoulder. In some embodiments, the plurality of openings passing through the wall of the valve body comprise at least three openings arranged in an annular fashion around a longitudinal axis of the inlet passage.

In some embodiments, the compressor further includes a first annular seal disposed between the valve body and a wall of the inlet passage in the compressor housing and a second annular seal disposed between the piston and the wall of the inlet passage in the compressor housing. In certain of these embodiments, the compressor further includes a vent formed in the wall of the inlet passage in the compressor housing, the vent allowing air to flow therethrough as the piston moves relative to the valve body. In some embodiments, the valve body includes a longitudinal channel therein and the piston is slideably disposed within the channel in the valve body. In some embodiments, the compressor further includes an annular seal disposed between the piston and the valve body.

The invention and its particular features and advantages will become more apparent from the following detailed description considered with reference to the accompanying drawings.

DETAILED DESCRIPTION OF AN
EMBODIMENT OF THE INVENTION

Figure 1:
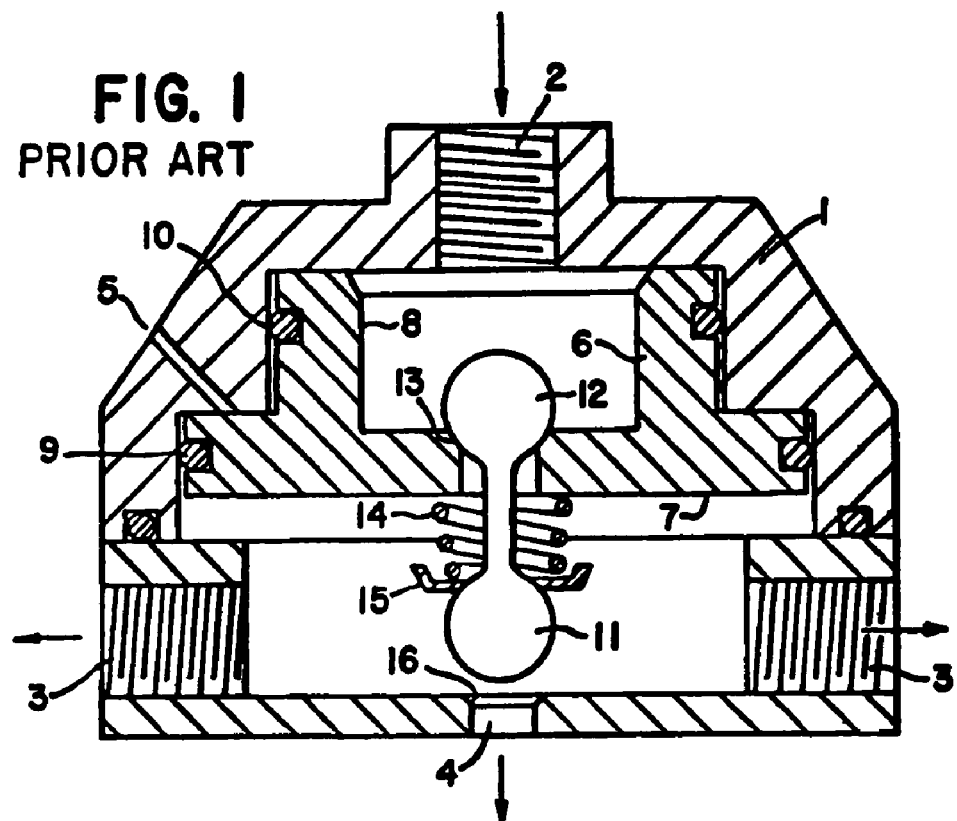
FIG. 1 is a partially cross-sectional side view of a pressure reducing valve in accordance with a prior art design.
Figure 2:
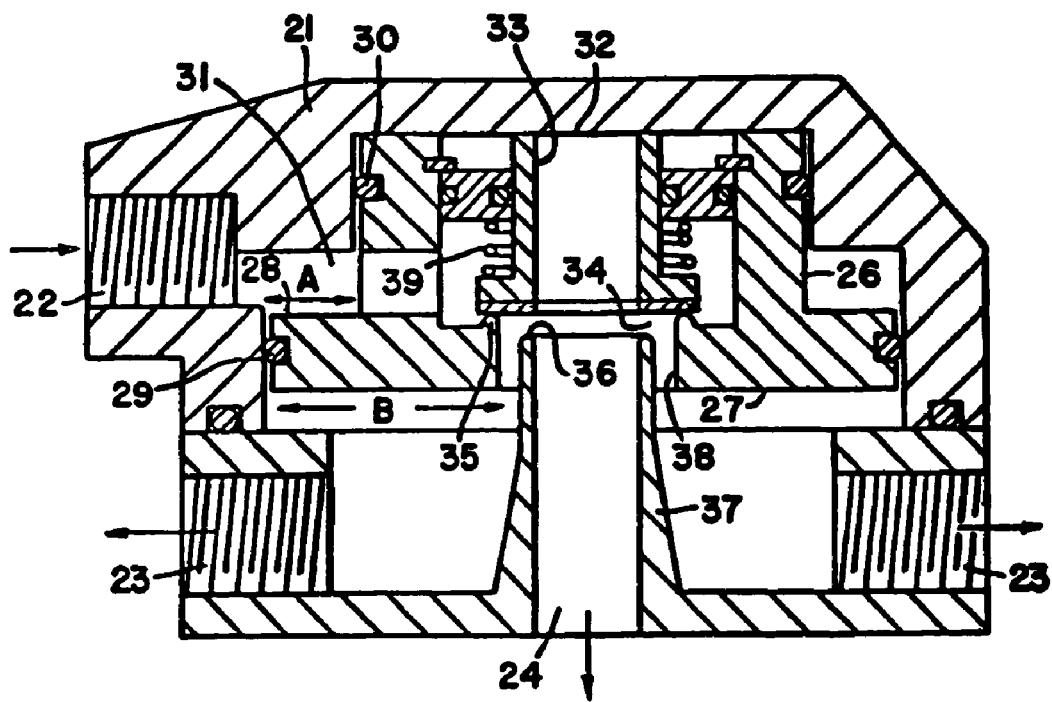
FIG. 2 is a partially cross-sectional side view of a pressure reducing valve in accordance with another prior art design.
Figure 3:
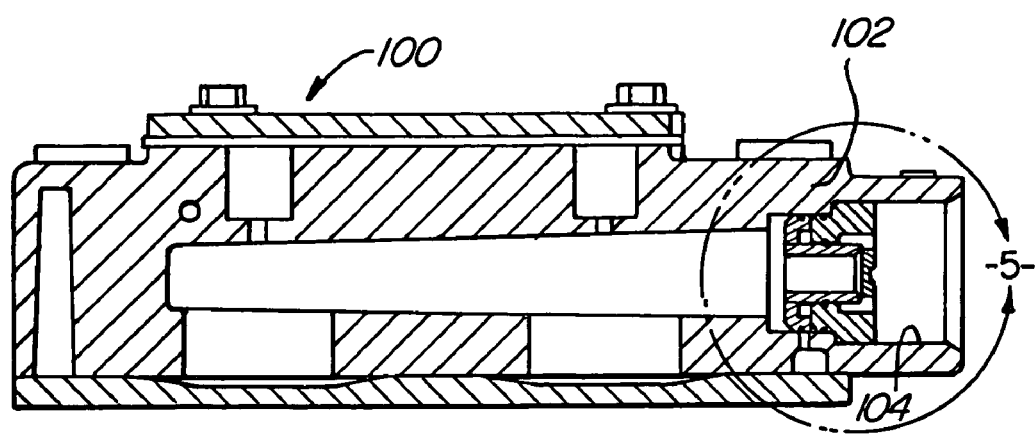
FIG. 3 is a partially cross-sectional top view of a compressor including a pressure reducing valve in accordance with an embodiment of the present invention.
Figure 4:
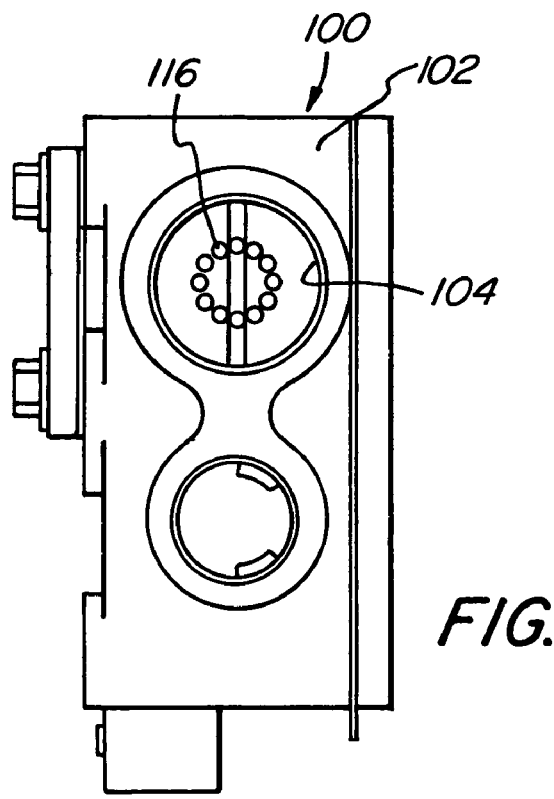
FIG. 4 is an elevational end view of the compressor including a pressure reducing valve of FIG. 3.

Referring to FIGS. 3 and 4, a portion of a compressor 100 in accordance with the present invention is shown. More specifically, FIGS. 3 and 4 show a head portion of compressor 100. It should be noted that compressor 100 is not shown in detail in the Figures and is not described in detail herein because the particular configuration of compressor 100 is not important to the configuration and operation of the present invention.

Compressor 100 includes a housing 102 having an inlet passage 104 therein. Inlet passage 104 is adapted to be fluidly connected to a supply of air which has already been partially pre-pressurized to some degree, such as that provided by the air system from a truck engine. As discussed above, it is not uncommon for the air pressure in the intake manifolds of such trucks to be 75 psi to meet emissions requirements as established by federal regulations, and with the advent of ever higher emissions controls on diesel engines, some engine manufacturers are increasing or are expected to increase the air intake manifold pressures even higher through improvements in the turbo charger.

Figure 5:
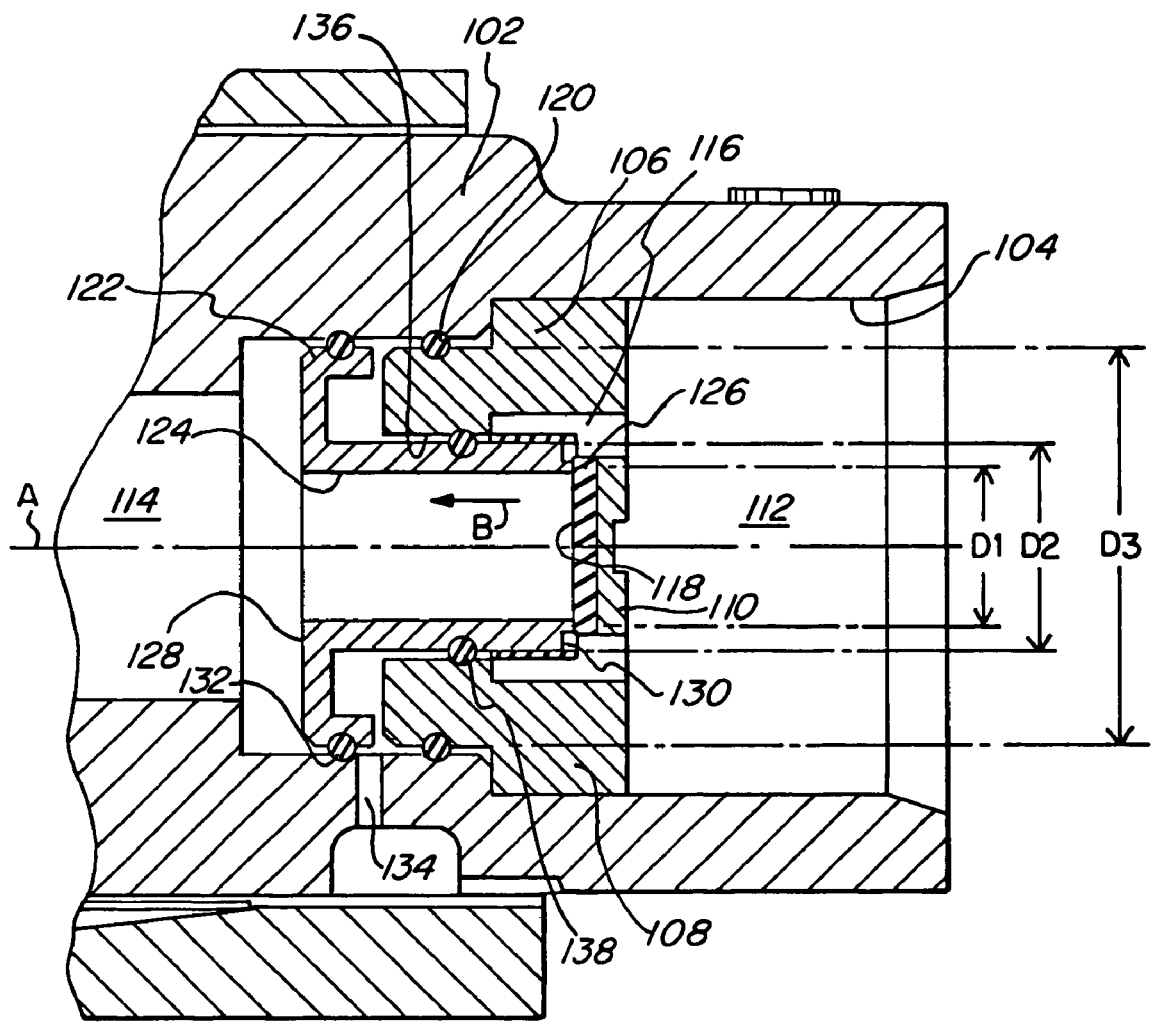
FIG. 5 is an enlarged partially cross-sectional top view of the highlighted portion of FIG. 3 showing in more detail the pressure reducing valve of the compressor.

The fluid connection between inlet passage 104 and the supply of partially pre-pressurized air may be accomplished, for example, by way of a threaded engagement, or by any of numerous other means. As best seen in FIG. 5, inlet passage 104, which may be formed integrally into housing 102, is relatively simple in design comprising a longitudinal passage having a relatively few number of portions having varying diameters with shoulders therebetween.

Disposed within inlet passage 104 in compressor housing 102 is a pressure reducing valve 106. Pressure reducing valve 106 includes a valve body 108 statically mounted within inlet passage 104 in compressor housing 102. Valve body 108 includes a wall 110 arranged transverse to inlet passage 104 and dividing inlet passage 104 into an input side 112 and an output side 114. Wall 110 includes a plurality of openings 116 passing therethrough from input side 112 to output side 114. Preferably at least three, and most preferably even more, openings 116 are provided, with the openings 116 preferably being arranged in an annular fashion around a longitudinal axis A of inlet passage. 104 (as best seen in FIG. 4). A portion of the wall 110 between openings 116 and facing output side 114 defines a sealing surface 118, the significance of which will be described below.

As shown in the Figures, valve body 108 may have the shape of a stepped bushing having two sections, each with a different diameter, separated by a shoulder which abuts a shoulder within inlet passage 104. Of course, other configurations are also possible without changing the nature of the present invention. An annular seal 120 may be disposed between valve body 108 and a wall of inlet passage 104 in order to inhibit fluid at inlet side 112 from passing around valve body 108.

Pressure reducing valve 106 also includes a piston 122 slideably disposed within inlet passage 104 in compressor housing 102. Piston 122 includes a channel 124 passing longitudinally therethrough with a sealing ledge 126 surrounding channel 124 on a first end thereof, a flange 128 surrounding channel 124 on a second end thereof, and an annular shoulder 130 surrounding sealing ledge 126. An outermost wall of piston 122 forms a seal with, and is slideable relative to, a wall of inlet passage 104. An annular seal 132 may be provided in this area in order to inhibit fluid at output side 114 from passing around piston 122.

A vent 134 is formed in a wall of inlet passage 104 in compressor housing 102 in an area between valve body 108 and piston 122 (and more particularly between seal 120 and seal 132) in order to allow air to flow therethrough as piston 122 moves relative to valve body 108. Valve body 108 includes a longitudinal channel 136 with piston 122 being slideably disposed therein. An annular seal 138 may be disposed between piston 122 and valve body 108 in order to inhibit the flow of fluid therebetween.

In operation, fluid pressure at input side 112 acts, through openings 116, on shoulder 130 and biases piston 122 toward output side 114 while at the same time fluid pressure at output side 114 acts on flange 128 and biases piston 122 toward input side 112. Of course, as will be recognized by those skilled in the art, the forces acting on piston 122 will be dependent upon the pressure at each side, as well as the effective surface area on which such pressure is acting. Thus, the effective surface area of shoulder 130 would be the difference of the surface area defined by diameter D2 less the surface area defined by diameter D1. Similarly, the effective surface area of flange 128 would be the difference of the surface area defined by diameter D3 less the surface area defined by diameter D1.

Since the effective surface area of flange 128 is larger than the effective surface area of shoulder 130, less pressure at output side 114 would be required to cause piston 122 to move toward input side 112 than would be required at input side 112 to cause piston 122 to move toward output side 114. Moreover, at some threshold ratio of the pressure at input side 112 as compared to the pressure at output side 114, the forces exerted on piston 122 are equal, and piston would be in equilibrium. Above this threshold pressure, piston 122 would be biased toward output side 114, and below this threshold pressure, piston 122 would be biased toward input side 112. Of course, as will be recognized by those skilled in the art, this threshold value is a function of the effective surface area of flange 128 and the effective surface area of shoulder 130, and as such the threshold value is variable by varying at least one of the effective surface area of flange 128 and the effective surface area of shoulder 130.

In operation, when a ratio of pressure at input side 112 as compared to pressure at output side 114 is below the threshold value, piston 122 is biased by pressure at output side 114 so as to cause sealing ledge 126 of piston 122 to seal against sealing surface 118 of wall 110 of valve body 108 (the position shown in FIG. 5) such that input side 112 is isolated from output side 114. When a ratio of pressure at input side 112 as compared to pressure at output side 114 is above the threshold value, piston 122 is biased by pressure at input side 112 so as to cause piston to move in the direction indicated by arrow B thus causing sealing ledge 126 of piston 122 to unseal from sealing surface 118 of wall 110 of valve body 108 such that input side 112 is in communication with output side 114 and fluid flows from input side 112 through openings 116 in wall 110 of valve body 108 and through longitudinal channel 124 in piston 122 to output side 114.

Figure 6:
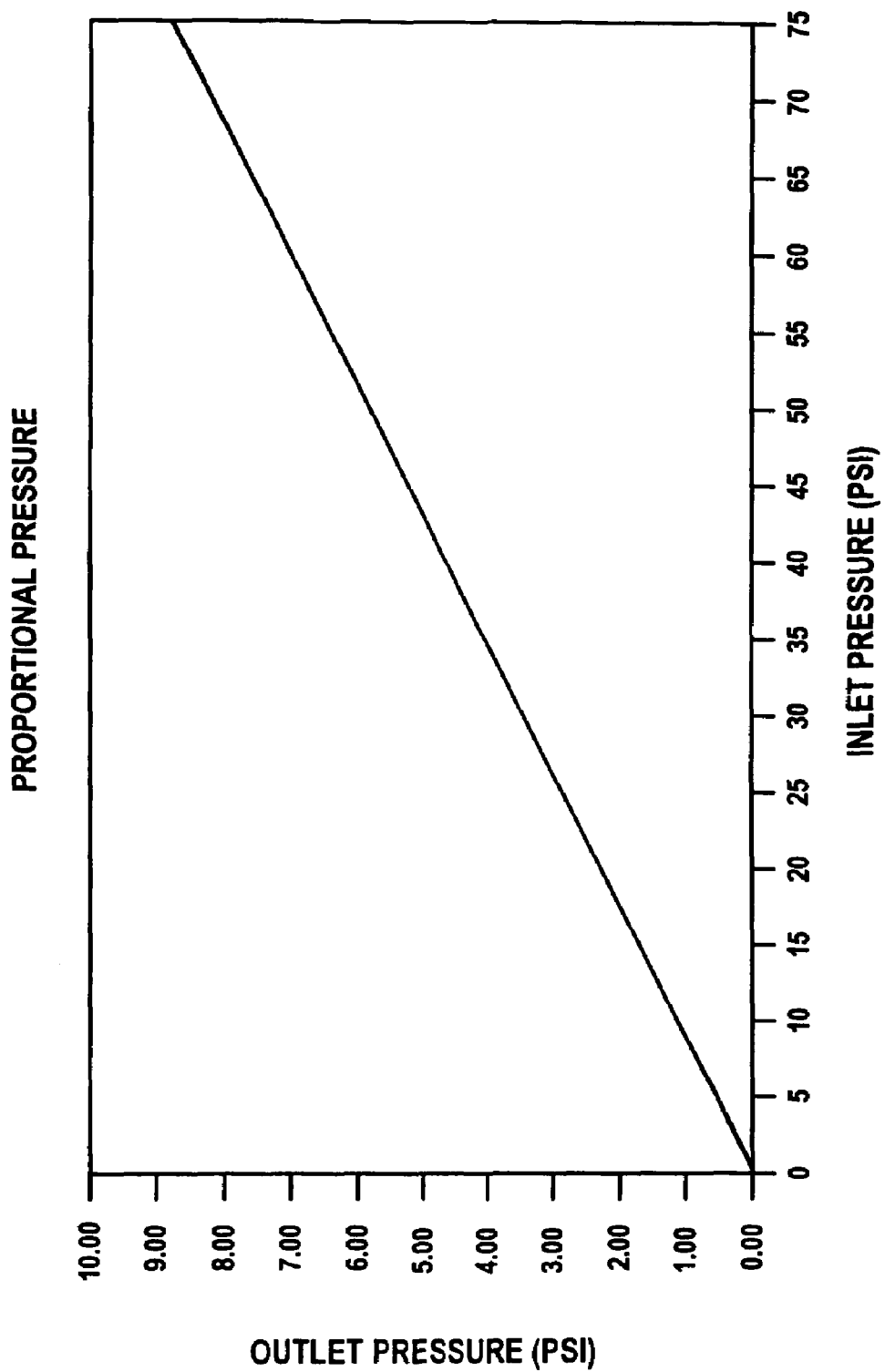
FIG. 6 a graph illustrating the proportional relationship between the inlet pressure and the outlet pressure of the pressure reducing valve shown in FIG. 5.

Referring now to FIG. 6, a graph is presented in order to illustrate the proportioning capabilities of a pressure reducing valve 106 in accordance with an embodiment of the present invention. Pressure reducing valve 106 in this example, the operation of which is represented in FIG. 6 has the following pertinent dimensions: D1=0.390"; D2=0.500"; and D3=0.960". Thus, an effective surface area of shoulder 130 would be 0.0769 in$^2$, while an effective surface area of flange 128 would be 0.6044 in$^2$. The resulting threshold value would be 0.1272. The graph shown in FIG. 6 illustrates this relationship and shows, for each inlet pressure the corresponding outlet pressure created by pressure reducing valve 106.

The present invention, therefore, provides a pressure reducing valve which reduces the air pressure of inlet air which reaches working components of a compressor, which is relatively simple in design (e.g., requiring few moveable parts, no springs, parts having simple shapes, few seals, etc.), which is inexpensive to produce, easy to assemble and not prone to failure, and which is readily capable of being easily integrated into the head of an air compressor itself.

Although the invention has been described with reference to a particular arrangement of parts, features and the like, these are not intended to exhaust all possible arrangements or features, and indeed many other modifications and variations will be ascertainable to those of skill in the art.

What is claimed is:

1. An air compressor comprising:
   a compressor housing having an inlet passage therein adapted to receive pressurized air;
   a pressure reducing valve disposed within the inlet passage in said compressor housing, said pressure reducing valve comprising a valve body statically mounted within the inlet passage in said compressor housing and a piston slideably disposed within the inlet passage in said compressor housing, said pressure reducing valve dividing the inlet passage in said compressor housing into an input side and an output side;
   wherein fluid pressure at the input side acts on the piston and biases the piston toward the output side and wherein fluid pressure at the output side acts on the piston and biases the piston toward the input side;
   wherein when a ratio of pressure at the input side as compared to pressure at the output side is below a threshold value, the piston is biased by pressure at the output side so as to cause the piston to seal against the valve body such that the input side is isolated from the output side; and wherein when a ratio of pressure at the input side as compared to pressure at the output side is above the threshold value, the piston is biased by pressure at the input side so as to cause the piston to unseal from the valve body such that the input side is in communication with the output side and fluid flows from the input side through said pressure reducing valve to the output side.

2. The compressor of claim 1 wherein an effective surface area of a side of the piston facing the output side is larger than an effective surface area of a side of the piston facing the input side.

3. The compressor of claim 1 wherein the threshold value is a function of an effective surface area of a side of the piston facing the output side and an effective surface area of a side of the piston facing the input side.

4. The compressor of claim 1 wherein the threshold value is variable by varying at least one of an effective surface area of a side of the piston facing the output side and an effective surface area of a side of the piston facing the input side.

5. The compressor of claim 1
wherein the valve body includes a wall arranged transverse to the inlet passage in said compressor housing, the wall having a plurality of openings passing therethrough from the input side to the output side, a portion of the wall between the openings and facing the output side defining a sealing surface; and
wherein the piston has a channel passing longitudinally therethrough with a sealing ledge surrounding the channel on a first end thereof, a flange surrounding the channel on a second end thereof, and an annular shoulder surrounding the sealing ledge.

6. The compressor of claim 5 wherein the plurality of openings passing through the wall of the valve body comprise at least three openings arranged in an annular fashion around a longitudinal axis of the inlet passage in said compressor housing.

7. The compressor of claim 5 wherein the valve body includes a longitudinal channel therein and wherein the piston is slideably disposed within the channel in the valve body.

8. The compressor of claim 7 further comprising an annular seal disposed between the piston and the valve body.

9. The compressor of claim 1 further comprising a first annular seal disposed between the valve body and a wall of the inlet passage in said compressor housing and a second annular seal disposed between the piston and the wall of the inlet passage in said compressor housing.

10. The compressor of claim 9 further comprising a vent formed in the wall of the inlet passage in said compressor housing, said vent allowing air to flow therethrough as the piston moves relative to the valve body.

11. An air compressor comprising:
a compressor housing having an inlet passage therein adapted to receive pressurized air;
a pressure reducing valve disposed within the inlet passage in said compressor housing, said pressure reducing valve comprising:
a valve body disposed within the inlet passage in said compressor housing, said valve body having a wall arranged transverse to the inlet passage and dividing the inlet passage into an input side and an output side, the wall having a plurality of openings passing therethrough from the input side to the output side, a portion of the wall between the openings and facing the output side defining a sealing surface; and
a piston slideably disposed within the inlet passage in said compressor housing, said piston having a channel passing longitudinally therethrough with a sealing ledge surrounding the channel on a first end thereof, a flange surrounding the channel on a second end thereof, and an annular shoulder surrounding the sealing ledge;
wherein fluid pressure at the input side acts on the shoulder and biases said piston toward the output side and wherein fluid pressure at the output side acts on the flange and biases said piston toward the input side;
wherein when a ratio of pressure at the input side as compared to pressure at the output side is below a threshold value, said piston is biased by pressure at the output side so as to cause the sealing ledge of said piston to seal against the sealing surface of the wall of said valve body such that the input side is isolated from the output side; and
wherein when a ratio of pressure at the input side as compared to pressure at the output side is above the threshold value, said piston is biased by pressure at the input side so as to cause the sealing ledge of said piston to unseal from the sealing surface of the wall of said valve body such that the input side is in communication with the output side and fluid flows from the input side through the openings in the wall of said valve body and through the longitudinal channel in said piston to the output side.

12. The compressor of claim 11 wherein an effective surface area of the flange is larger than an effective surface area of the shoulder.

13. The compressor of claim 11 wherein the threshold value is a function of an effective surface area of the flange and an effective surface area of the shoulder.

14. The compressor of claim 11 wherein the threshold value is variable by varying at least one of an effective surface area of the flange and an effective surface area of the shoulder.

15. The compressor of claim 11 wherein the plurality of openings passing through the wall of said valve body comprise at least three openings arranged in an annular fashion around a longitudinal axis of the inlet passage.

16. The compressor of claim 11 further comprising a first annular seal disposed between said valve body and a wall of the inlet passage in said compressor housing and a second annular seal disposed between said piston and the wall of the inlet passage in said compressor housing.

17. The compressor of claim 16 further comprising a vent formed in the wall of the inlet passage in said compressor housing, said vent allowing air to flow therethrough as said piston moves relative to said valve body.

18. The compressor of claim 11 wherein said valve body includes a longitudinal channel therein and wherein said piston is slideably disposed within the channel in said valve body.

19. The compressor of claim 11 further comprising an annular seal disposed between said piston and said valve body.

* * * * *